United States Patent [19]

Suzuki et al.

[11] Patent Number: 4,826,954
[45] Date of Patent: May 2, 1989

[54] DIORGANOPOLYSILOXANE-AZOBENZENE ALTERNATING COPOLYMERS AND METHODS FOR THEIR PREPARATION

[75] Inventors: Toshio Suzuki, Kimitsu; Masahiro Irie, Osaka, both of Japan

[73] Assignee: Toray Silicone Co., Ltd., Tokyo, Japan

[21] Appl. No.: 149,781

[22] Filed: Jan. 29, 1988

[30] Foreign Application Priority Data

Feb. 2, 1987 [JP] Japan .................................. 62-22089

[51] Int. Cl.⁴ ...................... C08G 77/06; C08G 77/04
[52] U.S. Cl. ........................................ 528/15; 528/21; 528/26; 528/28; 528/31; 528/33; 528/38; 534/726
[58] Field of Search .................. 528/21, 28, 33, 31, 528/15, 38, 26; 534/726

[56] References Cited

U.S. PATENT DOCUMENTS

| | | | |
|---|---|---|---|
| 3,579,607 | 5/1971 | Matzner et al. | 528/31 |
| 3,741,932 | 6/1973 | Smith | 528/33 |
| 3,775,386 | 11/1973 | Citron | 528/33 |
| 4,189,546 | 2/1980 | Deichert | 528/26 |
| 4,358,391 | 11/1982 | Finkelmann | 252/299.01 |

FOREIGN PATENT DOCUMENTS

| | | | |
|---|---|---|---|
| 1252230 | 11/1986 | Japan | 528/28 |
| 0502913 | 2/1976 | U.S.S.R. | |

OTHER PUBLICATIONS

Neckers, Mechanistic Organic Photochemistry, Reinhold Publishing, 1967, pp. 72-75.

Primary Examiner—John C. Bleutge
Assistant Examiner—R. Dean, Jr.
Attorney, Agent, or Firm—Carl A. Yorimoto

[57] ABSTRACT

Novel diorganopolysiloxane-azobenzene alternating copolymers composed of repeat units having the formula

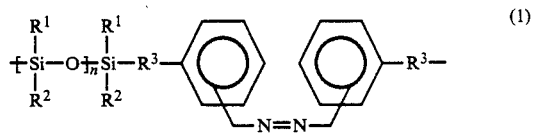

wherein n has a value greater than or equal to 1; each $R^1$ is independently selected from a group consisting of a hydrogen atom, a monovalent hydrocarbon group and an alkoxy group; each $R^2$ is independently selected from a group consisting of a monovalent hydrocarbon group and an alkoxy group; each $R^3$ is a linking group selected from a group consisting of an oxygen atom, $C_2$-$C_6$ alkylene groups, $-O(C=O)-$, $-R^4-N(R^5)-(C=O)-$, and $-R^6-(C=O)-N(R^7)-$, are described. These copolymers undergo reversible photomediated changes in their viscosity and absorption specta. Also described are methods for preparing these novel copolymers.

4 Claims, 1 Drawing Sheet

DIORGANOPOLYSILOXANE-AZOBENZENE ALTERNATING COPOLYMERS AND METHODS FOR THEIR PREPARATION

The present invention relates to diorganopolysiloxaneazobenzene alternating copolymers and methods for their preparation.

SUMMARY OF THE INVENTION

The object of the instant invention is to provide copolymers in which diorganopolysiloxane and azobenzene are alternately bonded via linking groups and which has a main chain which undergoes a reversible photomediated skeletal transition. A further object of the instant invention is to provide methods for preparation of these novel copolymers.

Because the main chain of the diorganopolysiloxaneazobenzene alternating copolymers of the instant invention contain photoisomerizable azobenzene, reversible photomediated skeletal structural conversions arise as a consequence. In this regard, illumination refers to energetic radiation such as ultraviolet radiation, visible light, and infrared radiation. For example. trans-azobenzene is converted to cis-azobenzene by UV radiation, while cis-azobenzene is converted to trans-azobenzene by the action of visible light, IR radiation, and heat. These characteristics are retained in the instant diorganopolysiloxane alternating copolymers. Due to the presence of azobenzene in the main chain, reversible photomediated skeletal structural conversions occur in response to, for example, UV radiation, visible light, and IR radiation, resulting in the characteristic feature of reversible changes in the viscosity and absorption spectrum.

The diorganopolysiloxane-azobenzene alternating copolymers of the instant invention demonstrate reversible photomediated changes in their viscosity and absorption spectra because of the properties mentioned above. Therefore. a major application of these copolymers will be as photorecordable information-carrying media.

DESCRIPTION OF THE INVENTION

Figure 1:
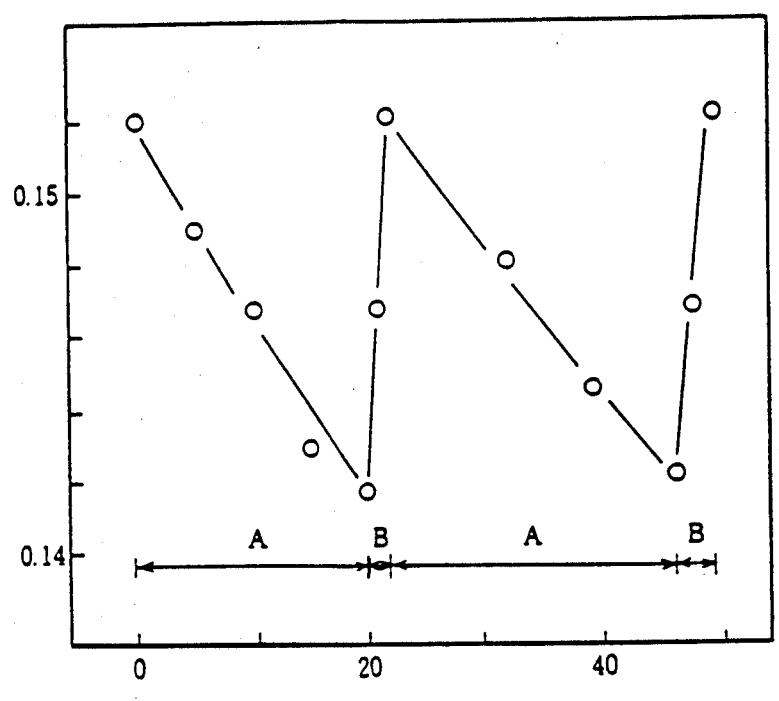
FIG. 1 is a graphical representation of the changes in the reduced viscosity due to exposure to UV radiation and visible light of a normal-hexane solution of the dimethyl-polysiloxane-azobenzene alternating copolymer obtained in Example 2 of the present invention. In the graph of FIG. 1, the y-axis (vertical axis) represents "Reduced Viscosity in deciliter/gram." The x-axis (horizontal axis) represents "Irradiation Time in minutes." In this figure, A represents data obtained under UV irradiation while B represents data obtained for exposure to visible light.

In accordance with the instant invention. diorganosiloxaneazobenzene alternating copolymers are provided under conditions that will be delineated herein. What is described, therefore, are diorganopolysiloxane-azobenzene alternating copolymers composed of repeat units havng the formula

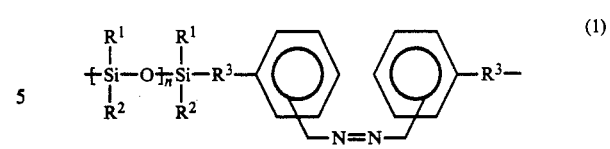

wherein n has a value greater than or equal to 1; each $R^1$ is independently selected from a group consisting of a hydrogen atom, a monovalent hydrocarbon group and an alkoxy group; each $R^2$ is independently selected from a group consisting of a monovalent hydrocarbon group and an alkoxy group; each $R^3$ is a linking group selected from a group consisting of an oxygen atom, $C_2$–$C_6$ alkylene groups, —O(C=O)—, —$R^4$—N($R^5$)—(C=O)—, and —$R^6$—(C=O)—N($R^7$)—, wherein the oxygen atom in —O(C=O)— is bonded directly to the silicon atom, $R^4$ and $R^6$ are divalent hydrocarbon groups which are bonded directly to the silicon atom, and $R^5$ and $R^7$ are hydrogen atom or lower alkyl groups.

$R^1$, which is a side chain in the diorganopolysiloxane moiety, can be, for example, a hydrogen atom; or a monovalent hydrocarbon group—e.g., alkyl groups such as methyl, ethyl, propyl, or butyl; halogenated alkyl groups such as chloromethyl or 3,3,3-trifluoropropyl; aryl groups such as phenyl, tolyl, or xylyl; aralkyl groups such as 2-phenylethyl or 2-phenylpropyl; alkenyl groups such as vinyl, allyl, or butenyl—or an alkoxy group such as methoxy or ethoxy, $R^2$, also a side chain, represents monovalent hydrocarbon groups and alkoxy groups. The monovalent hydrocarbon groups and alkoxy groups used as example for $R^1$ are also examples of this group. It is preferred that both $R^1$ and $R^2$ be monovalent hydrocarbon groups. In particular, it is preferred that $R^1$ be methyl and $R^2$ be methyl $C_2$–$C_{20}$ alkyl, phenyl, or 3,3,3-trifluoropropyl.

The diorganopolysiloxane moiety can be, for example, dimethylpolysiloxanes, dimethylsiloxane-diphenylsiloxane copolymers, dimethylsiloxane-methylphenylsiloxane copolymers, methylhydrogenpolysiloxanes, dimethylsiloxane-methylhydrogensiloxane copolymers, dimethylsiloxane-diethylsiloxane copolymers, methyloctylpolysiloxanes, methyl(3-phenylpropyl)polysiloxanes, dimethylsiloxane-methyl(chloromethyl)siloxane,copolymers, and methyl(3,3,3-trifluoropropyl)polysiloxanes.

The diorganopolysiloxane moiety is preferably a straight chain, but the presence of some branching is permissible. While the degree of polymerization, n, of this diorganopolysiloxane moiety will be n=1 or greater, it should be noted that the photoresponse becomes poor when the degree of polymerization is too high. Therefore, a preferred range for the degree of polymerization is n=10,000 or less, and the particularly preferred range is n=1000 or less.

The azobenzene moiety is, for example.

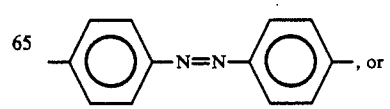, or

-continued

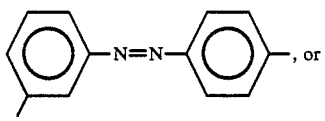, or

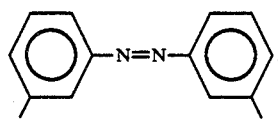.

R³, the group linking the diorganopolysiloxane and azobenzene moieties, is selected from the group consisting of the oxygen atom, C₂–C₆ alkylene groups. —O(C=O)—, —R⁴—N(R⁵)—(C=O)—, and —R⁶—(C=O)—N(R⁷)—, in which the oxygen atom in —O(C=O)— is directly bonded to the silicon atom; R⁴ and R⁶ represent divalent hydrocarbon groups. which are to be directly bonded to the silicon atom, such as methylene, ethylene, propylene. butylene or isobutylene; and R⁵ and R⁷ represent the hydrogen atom or lower alkyl groups, for example, methyl, ethyl, propyl, or butyl.

The repeat frequency for the instant invention's diorganopolysiloxane-azobenzene alternating copolymers having formula (1) is two or greater. Expressing the diorganopolysiloxane moiety as A and the azobenzene moiety as B, and omitting any representation of the linking groups and terminal reactive groups. the alternating copolymers of the instant invention may be expressed as (AB)q, (AB)qA, B(AB)q or

, where q is an integer with a value of 2 or greater. Reactive groups will be present at both terminals in the case of a linear polymer. When unstable reactive groups are present, stabilization can be carried out by hydrolysis or by reaction with a simple reactive blocking agent.

Additionally, in accordance with the instant invention there are provided several methods for preparing alternating copolymers of the diorganopolysiloxane and azobenzene moieties, described above. What is first described is a method for the preparation of diorganopolysiloxane-azobenzene alternating copolymer which consists of repeat units with the formula

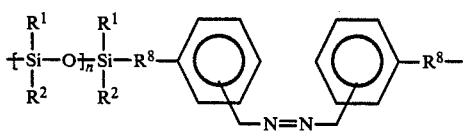

wherein n has a value greater than or equal to 1; each R¹ is independently selected from a group consisting of a hydrogen atom, a monovalent hydrocarbon group and an alkoxy group: each R² is independently selected from a group consisting of a monovalent hydrocarbon group and an alkoxy group; and R⁸ is an alkylene group having two through six carbon atoms, said method comprising catalytically adding a diorganopolysiloxane with the formula

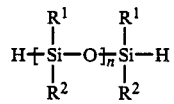

wherein n, R¹, and R² are defined above, with azobenzene having one alkenyl group on each benzene ring.

The catalytic addition reaction is a hydrosilylation reaction between silicon-bonded hydrogen atoms and the double bond in an alkenyl group in the presence of known hydrosilylation catalysts. While the hydrosilylation catalyst is not specifically restricted, platinum catalysts are preferred from the standpoints of reaction efficiency and reaction rate. In particular, alcohol solutions of chloroplatinic acid, platinum-olefin complexes, and complexes of chloroplatinic acid and vinylsiloxane are preferred.

The hydrosilylation conditions are again not specifically restricted. However. the reaction is preferably conducted in an inert organic solvent at 50° to 150° C. for several minutes to several days.

The alkenyl-containing azobenzene is to have one alkenyl group bonded to each benzene ring. This alkenyl group preferably contains from 2 to 6 carbon atoms, and alkenyl groups having the double bond at the position most remote from the benzene ring are particularly preferred. In general, azobenzene having one vinyl group bonded on each benzene ring is advantageous in terms of ease of starting material synthesis and in order to obtain a large skeletal photoconversion effect. In order to attain the maximum skeletal photoconversion effect. the alkenyl groups are preferably located para to the azo group.

It is preferred that the diorganopolysiloxane having functional groups at both terminals be reacted with the azobenzene having one functional group on each benzene ring at an approximately equimolar ratio.

It is preferred that an inert organic solvent be used in this method. The type of organic solvent is not specifically restricted. In general, solvents which can dissolve both the diorganopolysiloxane and functionalized azobenzene are suitable. Examples of these solvents are aromatic solvents such as benzene, toluene and xylene; ketones such as methyl ethyl ketone and methyl isobutyl ketone; alkanes such as hexane, heptane, and octane; and ethers such as diethyl ether and tetrahydrofuran.

What is described second is a method for the preparation of diorganopolysiloxane-azobenzene alternating copolymer which consists of repeat units with the formula

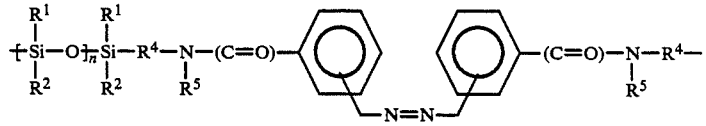

wherein n has a value greater than or equal to 1; each R¹ is independently selected from a group consisting of a hydrogen atom, a monovalent hydrocarbon group and an alkoxy group; each R² is independently selected from a group consisting of a monovalent hydrocarbon group and an alkoxy group; $R^4$ is a divalent hydrocarbon group which is bonded directly to the silicon atom; and $R^5$ is a hydrogen atom or lower alkyl groups, said method comprising reacting a diorganopolysiloxane having the formula

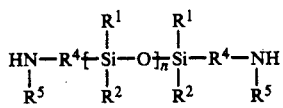

wherein n, $R^1$, $R^2$, $R^4$, and $R^5$ are defined above, with azobenzene having one chloroformyl group on each benzene ring in the presence of an HCl acceptor.

This hydrogen chloride-liberating (HCl) reaction is conducted in the presence of an HCl acceptor. The HCl acceptor is not specifically restricted as long as these agents are those ordinarily used in HCl-liberating reactions. Amines and inorganic salts are examples here. In particular, tertiary amines such as triethylamine and pyridine are advantageous because these do not readily degrade the —SiOSi— bonds in the diorganopolysiloxane.

The reaction conditions are not specifically restricted, but the reaction is preferably carried out in an inert organic solvent in a temperature range from 0° to 150° C. for several minutes to several hours.

The starting chloroformyl-substituted azobenzenes are well known to those skilled in the art. The chloroformyl groups in these azobenzene derivatives are preferably para to the azo group for the reasons given above. Diorganopolysiloxane having the aminoalkyl group or N-alkylaminoalkyl group at both terminals can be synthesized by reacting diorganopolysiloxane having chloroalkyl groups at both terminals with ammonia or monoalkylamines such as methylamine, ethylamine, propylamine, and butylamine.

As with the first method described above, it is preferred that an inert organic solvent be used in this method. The description of the solvents above is applicable to this method.

What is described third is a method for the preparation of diorganopolysiloxane-azobenzene alternating copolymer which consists of repeat units with the formula

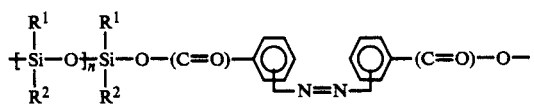

wherein n has a value greater than or equal to 1; each $R^1$ is independently selected from a group consisting of a hydrogen atom, a monovalent hydrocarbon group and an alkoxy group; each $R^2$ is independently selected from a group consisting of a monovalent hydrocarbon group and an alkoxy group, said process comprising reacting a diorganopolysiloxane with the formula

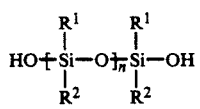

wherein n, $R^1$, and $R^2$, are defined above, with azobenzene having one chloroformyl group on each benzene ring in the presence of an HCl acceptor.

The discussions above for the second method relative to the HCl acceptor, reaction conditions, and a preference for carrying out this method in the presence of an inert solvent are applicable for this third method.

Again, the chloroformyl groups in the azobenzene is preferably para to the azo group for the reasons given above.

Diorganopolysiloxanes having silanol groups can be synthesized by known methods.

What is described fourth is a method which comprises reacting diorganopolysiloxane having chloroformylalkyl groups at both terminals with azobenzene having one amino group on each benzene ring in the presence of a HCl acceptor.

This method affords diorganopolysiloxane-azobenzene alternating copolymers having —$R^6$—(C=O)—N($R^7$)— as the linking unit $R^3$ in formula (1). In this formula, $R^6$ is an alkylene group and $R^7$ is a hydrogen atom or a lower alkyl group.

The discussions above for the second method relative to the HCl acceptor, reaction conditions. and a preference for carrying out this method in the presence of an inert solvent are applicable for this fourth method.

Diorganopolysiloxane having chloroformylalkyl groups at both terminals can be synthesized by oxidation of the cyanoalkyl groups in cyanoalkyl-terminated diorganopolysiloxane to the corresponding carboxyl groups and by the subsequent chlorination of these carboxyl groups.

What is described fifth is a method which comprises reacting a diorganopolysiloxane having chlorine atoms bonded to the silicon atoms at both terminals and azobenzene having one hydroxyl group on each benzene ring in the presence of an HCl acceptor.

This method affords diorganopolysiloxane-azobenzene alternating copolymers having the oxygen atom for $R_3$ in formula (1).

The discussions above for the second method relative to the HCl acceptor reaction conditions, and a preference for carrying out this method in the presence of an inert solvent are applicable for this fifth method.

So those skilled in the art may better understand and appreciate the instant invention, the following examples are presented. These examples are presented as being illustrative and are not to be construed as limiting the claims of the instant invention.

In the examples, parts=weight parts; and percent or % refers to weight percent. Unless otherwise specified, all values were measured at 25° C.

EXAMPLE 1

100 parts dimethylhydrogensiloxy-terminated dimethylpolysiloxane (average molecular weight by gel permeation chromatography (GPC) =5,500, silicon-bonded hydrogen equivalent weight=2.200), 5.32 parts p,p'-divinylazobenzene, and 250 parts toluene were placed in a flask equipped with a stirrer, reflux condenser, and thermometer, and the mixture was stirred to uniformity. Subsequently, 1.3 parts 2% isopropanolic chloroplatinic acid was added to the mixture, and a reaction was carried out at 50° C. for 30 hours. After completion of the reaction, the toluene was removed by distillation in vacuo to afford a highly viscous product. The average molecular weight of this product as determined by GPC was 20,500. IR spectral analysis confirmed the disappearance of the SiH bonds (2100 -2200 $cm^{-1}$) and the introduction of azobenzene (1580–1620 $cm^{-1}$) When the UV absorption spectrum of this product was taken on its 0.1 wt % cyclohexane solution, an absorption peak was observed at 330–340 nm. When this cyclohexane solution was continuously exposed to the UV radiation. extinction of the absorption in this spectrum was observed. In addition, the absorption peak in the spectrum increased again when the cyclohexane solution was exposed to visible light.

The preceding results confirmed the obtained product to be an alternating copolymer in which dimethylpolysiloxane and azobenzene were connected by ethylene bonds.

EXAMPLE 2

100 parts N-butylaminomethyl(dimethyl)siloxy-terminated dimethylpolysiloxane (average molecular weight by GPC=5,300, amino equivalent weight=2.140), 7.24 parts p,p'-dichloroformylazobenzene, 5.56 parts pyridine. and 250 parts toluene were placed in a flask equipped with a stirrer, reflux condenser, and thermometer, and the mixture was heated under reflux for 3 hours. After removing the precipitate from the reaction solution by filtration, the toluene was removed by distillation in vacuo to afford a highly viscous product. The average molecular weight as measured by GPC was 25,000. IR spectral analysis confirmed the formation of amide bonds (1600–1660 cm$^{-1}$). The product's UV absorption spectrum was taken as in Example 1: an absorption peak appeared at 330–340 nm, and it was extinguished by the UV irradiation. The variation in the reduced viscosity during exposure to UV and visible radiation was measured using the product's 1 g/100 ml hexane solution, and the results are reported in FIG. 1.

The preceding results confirmed the product to be an alternating copolymer in which dimethylpolysiloxane and azobenzene were linked by means of —CH$_2$—N(C$_4$H$_9$)—(C=O)— groups.

EXAMPLE 3

100 parts silanol-terminated phenylmethylpolysiloxane (average molecular weight by GPC=1,100), 27.9 parts p,p'-dichloroformylazobenzene, 300 parts tetrahydrofuran, and 15 parts triethylamine were placed in a flask equipped with a stirrer, reflux condenser, and thermometer, and the mixture was heated under reflux for 3 hours. The precipitate was removed from the reaction solution by filtration, and the tetrahydrofuran was then removed by distillation in vacuo to afford a somewhat viscous liquid. The average molecular weight of this product was determined to be 4.500 by GPC. IR spectral analysis confirmed the disappearance of the silanol groups (3200–3700 cm$^{-1}$) and the formation of carboxyl ester groups (1700–1800 cm$^{-1}$). These results confirmed that the obtained product was an alternating copolymer in which phenylmethylpolysiloxane and azobenzene were linked by —O—(C=O)— groups.

What is claimed is:

1. Diorganopolysiloxane-azobenzene alternating copolymers composed of repeat units having the formula

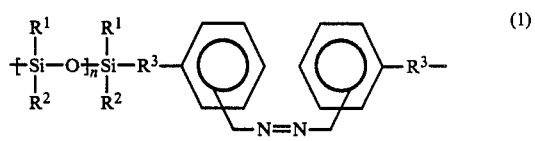

wherein n has a value greater than or equal to 1; each R$^1$ is independently selected from a group consisting of a hydrogen atom, a monovalent hydrocarbon group and an alkoxy group; each R$^2$ is independently selected from a group consisting of a monovalent hydrocarbon group and an alkoxy group; wherein each R$^3$ is a linking group selected from a group consisting of an oxygen atom, C$_2$—C$_6$ alkylene groups, —O(C=O)—, —R$^4$—N(R$^5$)—(C=O)—, and —R$^6$—(C=O)—N(R$^7$)—, wherein the oxygen atom in —O(C=O)— is bonded directly to the silicon atom, R$^4$ and R$^6$ are divalent hydrocarbon groups which are bonded directly to the silicon atom, and R$^5$ and R$^7$ are hydrogen atom or lower alkyl groups.

2. Diorganopolysiloxane-azobenzene alternating copolymers according to claim 1, wherein R$^1$ is a methyl group and R$^2$ is independently selected from a a group consisting of a methyl group and a phenyl group.

3. Diorganopolysiloxane-azobenzene alternating copolymers according to claim 1, wherein R$^3$ is the ethylene group.

4. Diorganopolysiloxane-azobenzene alternating copolymers according to claim 1, wherein R$^4$ is an alkylene group having 1 to 3 carbon atoms, and R$^5$ is the hydrogen atom.

* * * * *